United States Patent [19]

Callender

[11] 3,914,547

[45] Oct. 21, 1975

[54] TELEVISION CHASSIS STRUCTURE

[76] Inventor: Russell J. Callender, 931 University Ave., St. Paul, Minn. 55104

[22] Filed: Aug. 26, 1970

[21] Appl. No.: 67,283

Related U.S. Application Data

[63] Continuation of Ser. No. 296,637, July 22, 1963, abandoned, which is a continuation-in-part of Ser. No. 839,212, Jan. 21, 1953, abandoned, and Ser. No. 332,233, Jan. 21, 1953, abandoned.

[52] U.S. Cl. .......... 178/7.9

[51] Int. Cl. .......... H04n 5/64

[58] Field of Search .......... 178/7.8, 7.81, 7.82, 7.83, 178/7.84, 7.9; 325/352, 353

[56] References Cited

UNITED STATES PATENTS 2,917,577 12/1959 Harman .......... 178/7.9

FOREIGN PATENTS OR APPLICATIONS 773,321 4/1957 United Kingdom .......... 178/7.8

*Primary Examiner*—Robert L. Griffin
*Assistant Examiner*—Michael A. Masinick

[57] ABSTRACT

An improved arrangement in the television art providing for cooler operation of small cabinet structure encasing the picture tube with a close chassis mounting of television receiver components, which normally operate at high and burning temperatures, overheating the chassis, cabinet and components, but are prevented therefrom by effecting a chimney-like draft flow therethrough and through the perforated chassis about the component elements, in the manner of a plurality of convection air currents, resulting in a discovery providing an improvement in consistency and maintainance of electrical characteristics of the heated circuit components and picture reception.

1 Claim, 3 Drawing Figures

TELEVISION CHASSIS STRUCTURE

This application is a continuation of application Ser. No. 296,637 filed Jul. 22, 1963 which in turn is a continuation-in-part of Ser. No. 839,212 and 332,233 filed Jan. 21, 1953, all now abandoned.

This invention relates to a new and improved economically useful chassis structure for mounting television receiver component elements in closely compacted relationship about the stem end of a cathode ray picture tube and substantially within the physical dimension of the picture projection viewing screen end of the picture tube. More particularly, the improvement concerns the provision of new and useful chassis structural build and arrangement designed for maintaining the cabinet and chassis cover structure at reduced temperatures and provide for lower temperature operation of the component receiver elements, by improving the air circulation about the component elements and increasing the air flow therethrough by at least about 50% over that which has heretofore been possible to obtain.

Among the many problems which face the television art is to devise ways to build the component receiver elements about the stem end of a picture tube in compact relationship to reduce the cabinet size and yet keep the components from burning up, keep finish on the cabinet structure and the set in prolonged operative condition. At the same time it is desirable to keep the chassis and component elements readily accessible for ease in manufacture, replacement and repair, with the chassis structure being able to maintain operational efficiency of the electric circuits.

At the present time the temperature rise in arranging the component parts closer together, with the resultant inefficiency and loss of vertical sweep output has been partially overcome by use of thermoster resistors in the vertical sweep circuits. However, the problem is further increased with transistors due to their drop in efficiency upon a temperature rise as with the electron tube arrangement.

The purpose of this improvement provides a way in which to overcome many of these problems and it has surprisingly been discovered that improved results of an unexpected nature are obtained.

Accordingly, it is an object of this improvement in chassis structure and arrangement to provide therewith the keeping of closely spaced component elements operating at a lower temperature with a mounting arrangement which facilitates long life for the circuitry and component elements including electron tubes and transistors.

Another object of this improvement is to provide small chassis structure behind the picture tube viewing screen end with the component receiver elements in close physical relationship, permitting small cabinet size and yet dissipating the more than normal high operating temperature of component elements in printed circuits or conventional circuitry and component parts mounted on the chassis.

An additional object of this improvement in the television art is to provide an improved small chassis structure and mounting arrangement therefor with adequate air flow about the component receiver elements and circuitry mounted thereon to cool the component elements and maintain the efficiency of the sweep circuits.

Another object is to provide an improved chassis arrangement on a television cabinet structure for mounting component receiver elements and circuitry thereon in closely spaced relationship about a picture tube stem end and substantially within the cross-sectional area of the viewing screen end of the picture tube.

The above and such improvements as herein provided will be more apparent from the following description and the accompanying drawings wherein.

Figure 1:
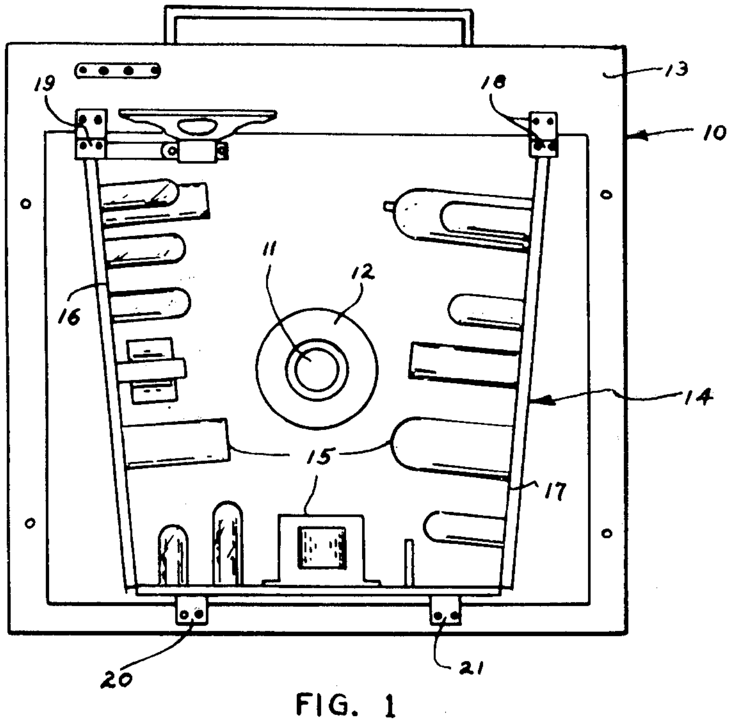
FIG. 1 is the rear plan view of a television cabinet structure with the preferred improved chassis structure herein described mounted thereto with closely spaced television component receiver elements mounted thereon.

In FIG. 1, the television cabinet structure 10 is of a conventional shell type being open at the front for the picture tube view screen (not shown) and also open at the rear from which the stem end of the picture tube projects and about which a conventional adjustable yoke 12 is mounted in a conventional manner (not shown).

As illustrated, the rear of the cabinet structure 10 is provided with an open back wall 13 extending as a rim about the top, sides and bottom of the cabinet structure. Fastened to the back wall 13 is the chassis structure 14 with the television receiver component elements 15 mounted thereon with their conventional circuitry (not shown) but as well known to the art, including conventional mounting means therefor (not shown).

Figure 3:
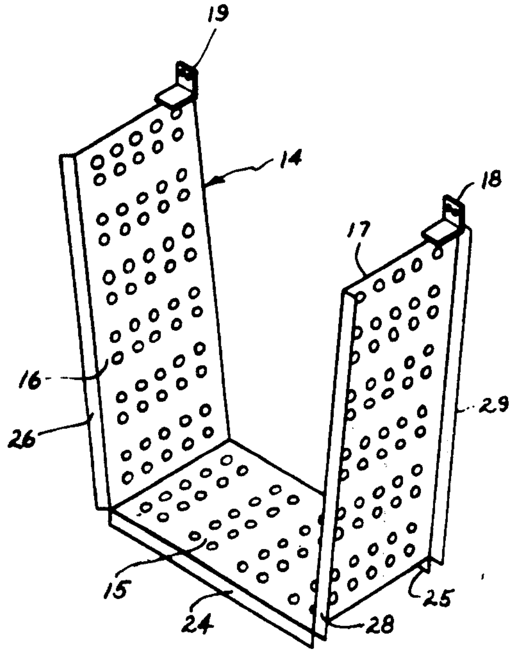
FIG. 3 is an isometric view of the improved chassis structure.
Figure 2:
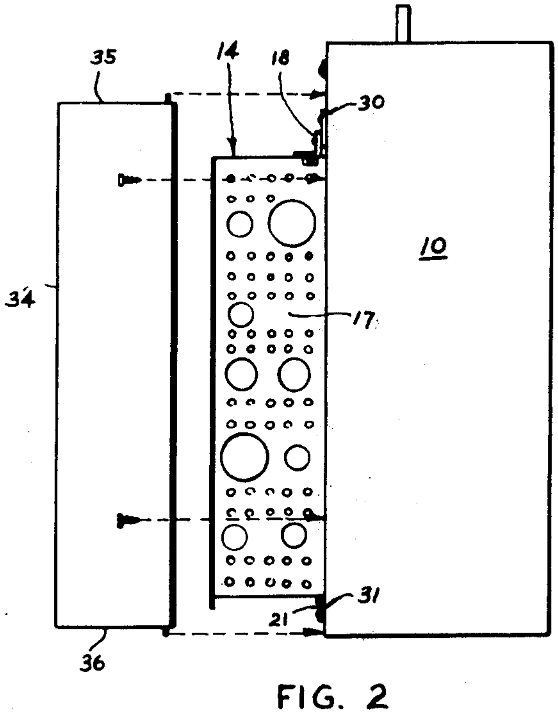
FIG. 2 is a side plan view of the structure of FIG. 1, and illustrating a back cover in exploded relationship thereto.

As shown in FIG. 3, in correlation with FIGS. 1 and 2, the chassis is a U-shaped structure having a perforated base 15 and a pair of perforated side members 16 and 17. Each of the members 15, 16 and 17 are provided with over substantially their major surface area with a number of perforations which permit the free passage of air therethrough.

In the preferred structure, as illustrated, the chassis sides 16 and 17 are tipped away from each other to form somewhat of a V-shape with a base 15 holding the sides 16 and 17 in spaced tipped relationship. To fasten or secure the chassis 14 to the back wall 13, of cabinet 10, there are provided a number of fastening means as top extensions 18 and 19 and bottom extensions 20 and 21.

In the illustrated structure the chassis 14 is a thin metal strip with the sides 16 and 17 bent upwardly from the base 15. Otherwise the sides may be spot welded to the base or if of insulation board or the like fastened together with any suitable means. In the views, as illustrated, the edges of the chassis structure are bent at right angles to the face of the base 15 and side members 16 and 17, as at 24 and 25 on base 15, 26 and 27 for side member 16 and at 28 and 29 for side member 17. The bent edges 25, 27 and 29 provide flanges for mounting one side portion of the extensions 20 and 21 to base 15, extension 19 to side 16 and extension 18 to side 17. In fastening the projections 18, 19, 20 and 21, to flanges 17, 16 and 15 respectively, suitable screw means were used and also to mount and secure the chassis 14 to the back wall 13 of cabinet 10.

As shown in FIG. 2, the metal chassis 14 is mounted to the metal cabinet 10 with small strips of insulation as at 30 and 31 between the projecting members 18,

19, 20 and 21, by which the chassis is secured to the back cabinet wall with insulated fiber screws. When the chassis itself is formed of insulation material this precaution need not be taken. Similarly, when the mounting projection members 18, 19, 20 and 21 are themselves of insulated material normal screw means and other insulation is unnecessary.

A cover 34 for the chassis is provided. The top 35 and bottom 36 are also provided with substantially their whole surface areas covered with perforations to afford a steady and constant large flow of air therethrough and aid in providing a chimney-like effect without a damper, the openings also in the chassis structure obtain an additional beneficial cooling effect with an increased velocity of air flow.

Having provided this compact arrangement of a three sided chassis structure with the television receiver component elements and circuitry in closely spaced assembly thereon behind the viewing screen tube end and with the chassis cover 34 secured to the back of the cabinet, as will be apparent from the exploded view in FIG. 2, and the securing of such cabinet back covers, as known to the art, it was surprising to discover that the usual intense heat was dissipated and the picture and sound strip maintained steady alignment. Heretofore it has been difficult to maintain a steady picture for a long time without the picture on the screen seeming to be cut off. As indicated, the art has used thermoster resistors in the vertical sweep output to overcome this loss of efficiency and power decrease in operating efficiency due to high heat. This increases the current flow and as a result causes faster burning of the component elements and circuitry. This defect in making close assembly also requires the component elements to be well insulated for high temperature conditions.

With the present structure it has been discovered that the picture and sound strip do not become misaligned as heretofore caused by the rise and fall of temperature. In addition it has been discovered that the vertical and horizontal hold circuit potentiometers maintain their resistance range setting. Thus, angularly positioned perforated circuit boards and receiver components are now kept from scarring and the boards from warping. This provides a savings on the insulation properties of receiver components by their maintaining a steady operation at reduced temperatures. In the overall results, it has been discovered that a most important feature is more uniform maintenance of alignment for best picture quality in band width and phase. As an incidental feature the cabinet furniture finish is also maintained in better condition and is not burned off, as so often happens on small cabinet structures.

The beneficial effect is believed to be obtained by the combination of a great number of apertures in the walls of the chassis structure arrangement in combination with the openings in the bottom and top of the cover member 34. With the perforated members of the chassis tipped outwardly the many air streams pass upwardly as in a chimney, and relatively away from the base of each next adjacent component element and the circuitry, thus preventing electrical power loss through temperature increase.

As indicated, the sides of the chassis are preferably tipped outwardly for relatively spacing the many air streams in many separate flow paths by natural convection currents. Less preferably, the highly perforated chassis sides may be bent, welded or otherwise secured to a highly perforated base in a parallel relationship and mounted to the back wall or cabinet frame structure of the television cabinet by any suitable means, as also obviously can the perforated U-shaped chassis structure be mechanically mounted in any suitable manner. For example, it has been discovered that the inner edge portion of the perforated chassis may even partially extend into the cabinet shell, frame or superstructure and operates at a reduced temperature. In this relationship the base perforated chassis portion may be eliminated and only the perforated sides used preferably in an angular position.

Further, the chassis wall may now be consisted of a perforated printed circuit board with component elements mounted directly thereon. When used in the preferred arrangement described and preferably with a forced air draft, sufficient cooling is provided for long life.

It has also been found that a small "squirrel type air fan" can be mounted beneath the perforated chassis to aid in cooling the component elements and circuitry, if desired. However, without the fan, in the arrangement of the perforated base and perforated side walls, with an open top, such fan is not necessary to obtain the new and useful surprising results discovered by making this change, as described. Further, such chassis structure as herein provided, permits the use of smaller and minimum cabinet size.

It will be recognized that from what has been shown the electronic system is conventional in the preferred embodiment, and the chassis described herein some modification and changes may be made without departing from the true scope of these discoveries in resultant effects therefrom and improvement in the art, as embodied in the appended claims.

I claim:

1. A television receiver having a relatively permanent television cabinet structure portion having an open front for mounting a conventional picture tube screen end therein, said picture tube having a stem end adapted to extend rearwardly from said cabinet portion, said cabinet structure having cabinet walls adapted to extend partially about said picture tube stem and enclosing the picture tube screen end thereof, an open back wall on said cabinet structure through which said tube stem is adapted to extend, a perforated chassis structure adapted to extend about said stem and having upwardly extending perforated walls secured to and extending rearwardly of said cabinet structure, component receiver elements and circuitry therefore mounted in closely spaced relationship among the perforations of said perforated chassis, a closure cover mounted over said chassis having perforated top and bottom portions, wherein the said perforated chassis is an open top structure having perforated base and perforated side members mounting said component receiver elements about said stem of said television picture tube externally of said cabinet portion, whereby an increased air flow volume passes through said perforations in said cover and said perforations in said chassis and dissipates the heat from said component elements retaining the maximum efficiency of receiver component elements.

* * * * *